(12) United States Patent
Aliakseyeu et al.

(10) Patent No.: US 12,302,470 B2
(45) Date of Patent: May 13, 2025

(54) CONTROL SYSTEM AND METHOD OF CONFIGURING A LIGHT SOURCE ARRAY

(71) Applicant: SIGNIFY HOLDING B.V., Eindhoven (NL)

(72) Inventors: Dzmitry Viktorovich Aliakseyeu, Eindhoven (NL); Berent Willem Meerbeek, Veldhoven (NL); Joris Hubertus Antonius Hagelaar, Nuenen (NL); Jorge Gabriel Squillace, Eindhoven (NL); Bertrand Johan Edward Hontele, Breda (NL)

(73) Assignee: SIGNIFY HOLDING, B.V., Eindhoven (NL)

( * ) Notice: Subject to any disclaimer, the term of this patent is extended or adjusted under 35 U.S.C. 154(b) by 214 days.

(21) Appl. No.: 18/009,372

(22) PCT Filed: Jun. 4, 2021

(86) PCT No.: PCT/EP2021/064981
§ 371 (c)(1),
(2) Date: Dec. 9, 2022

(87) PCT Pub. No.: WO2021/249882
PCT Pub. Date: Dec. 16, 2021

(65) Prior Publication Data
US 2023/0262863 A1  Aug. 17, 2023

(30) Foreign Application Priority Data
Jun. 9, 2020  (EP) .................................... 20178870

(51) Int. Cl.
*H05B 47/155*  (2020.01)
*H05B 47/165*  (2020.01)
*H05B 47/19*  (2020.01)

(52) U.S. Cl.
CPC ......... *H05B 47/155* (2020.01); *H05B 47/165* (2020.01); *H05B 47/19* (2020.01)

(58) Field of Classification Search
CPC .... H05B 47/125; H05B 47/14; H05B 47/155; H05B 47/165; H05B 47/19; H05B 45/20; Y02B 20/40
See application file for complete search history.

(56) References Cited

U.S. PATENT DOCUMENTS

2009/0303229 A1\* 12/2009 Kwisthout ............... H04N 9/73
345/214
2010/0110000 A1\* 5/2010 De Greef ............... H05B 47/11
315/294
(Continued)

FOREIGN PATENT DOCUMENTS

WO   2018224390 A1   12/2018
WO   2019076667 A1   4/2019

*Primary Examiner* — Ryan A Lubit

(57) ABSTRACT

A method (500) of configuring a light source array (110) of a system is disclosed. The system further comprising a display (110) and a camera (108), wherein the light source array (110) comprises a plurality of individually controllable lighting units, and wherein the light source array (110) has been positioned relative to the display (110). The method (500) comprises: rendering (502) a pattern (122) on the display (110), controlling (504) one or more lighting units of a first segment (112) of the light source array (110) according to a first light setting, controlling (506) one or more lighting units of a second segment (114) of the light source array (110) according to a second light setting, obtaining (508) an image (140) captured by the camera (108), the image (140) comprising the display (110), the first segment (112) and the second segment (114), detecting (510) the pattern (122) in the image (140), detecting (512) the first light setting and the second light setting in the image (140), determining (514) positions of the first segment (112) and (Continued)

the second segment (114) relative to the display (110) in the image (140) based on the first light setting, the second light setting and the pattern (122) in the image (140), and determining (516) a mapping of the plurality of the individually controllable lighting units with respect to the display (110) based on the positions of the first segment (112) and the second segment (114) relative to the display (110) in the image (140), such that when media content is being rendered on the display (110) one or more lighting units of the plurality of the individually controllable lighting units are controlled based on the media content according to the mapping.

14 Claims, 5 Drawing Sheets

(56) References Cited

U.S. PATENT DOCUMENTS

| | | | |
|---|---|---|---|
| 2011/0051019 A1* | 3/2011 | Hardacker | H05B 47/196 |
| | | | 348/739 |
| 2015/0022563 A1* | 1/2015 | O'Donnell | G06F 3/1446 |
| | | | 345/88 |
| 2015/0091473 A1 | 4/2015 | Clavenna, II et al. | |
| 2018/0255625 A1 | 9/2018 | Lashina et al. | |
| 2018/0368230 A1* | 12/2018 | Chen | H05B 45/20 |
| 2019/0124749 A1* | 4/2019 | Deixler | H05B 47/125 |
| 2019/0215460 A1* | 7/2019 | Chen | H05B 47/115 |

* cited by examiner

CONTROL SYSTEM AND METHOD OF CONFIGURING A LIGHT SOURCE ARRAY

CROSS-REFERENCE TO PRIOR APPLICATIONS

This application is the U.S. National Phase application under 35 U.S.C. § 371 of International Application No. PCT/EP2021/064981, filed on Jun. 4, 2021, which claims the benefit of European Patent application Ser. No. 20/178, 870.0, filed ono Jun. 9, 2020. These applications are hereby incorporated by reference herein.

FIELD OF THE INVENTION

The invention relates to a method of configuring a light source array and to a computer program product for executing the method. The invention further relates to a control system for configuring a light source array.

BACKGROUND

Current home systems comprise a plurality of controllable lighting devices. In such systems, the lighting devices can be controlled based on media content that is being rendered on a display. A user may, for example, play a movie or a game on the display of a display device (e.g. a television, a pc monitor, a tablet pc, a projector, etc.). The lighting devices may be controlled based on the media content that is being rendered on the display, for instance by analyzing colors of images that are rendered on the display and by controlling the lighting devices accordingly. Alternatively, the lighting devices may be controlled according to a light script which comprises pre-programmed lighting control instructions for the lighting devices. The lighting control instructions are communicated to the lighting devices to control them in sync with the media content that is being rendered on the display. This brings the atmosphere of the movie or the game into the room of the user.

The lighting control instructions that are transmitted to the lighting devices depend on the location of the lighting devices relative to the display, such that locations of on-screen events (e.g. an explosion, a sunset, an object approaching from one side of the display, etc.) correspond to locations of light effects generated by the lighting devices. In present systems, a user interface is provided that enables a user to map the lighting devices onto the display, and thereby create a mapping of the lighting devices relative to the display. A map of a space is rendered on a screen of a mobile device (e.g. a smartphone), which shows a location of the display in the space. A user may position the lighting devices on the map of the space relative to the display, such that they can be controlled based on rendered media content accordingly.

A user may for example install a light strip behind the display or in proximity of the display, for example by placing the light strip on a surface (e.g. a wall, a tv cabinet, etc.) or on the back of the display device. However, installing and configuring such a light strip with individually controllable lighting units can be cumbersome for an average user.

US 2015/0091473 A1 discloses a method, apparatus, and user interface for providing a network-based surround-light environment to dynamically drive lighting scenes are described. Location information of one or more illuminating elements relative to a display for presenting media information is determined. Lighting characteristic information for the one or more illuminating elements is determined. And a lighting profile for illuminating the one or more illuminating elements based on the location information and lighting characteristic information is determined.

SUMMARY OF THE INVENTION

The inventors have realized that it may be difficult for users to map a light source array (e.g. a light strip) with individually controllable lighting units correctly with respect to a display. Such a light source array with individually controllable lighting units is able to create spatial light effects because each lighting unit is individually controllable. The inventors have realized that the mapping of such a light source array with respect to a display needs to be correct such that segments/lighting units of the light source array are correctly aligned with areas of the display. This is desirable to optimize the user experience when a user is watching media content on the display, because an incorrect mapping would result in that the light effects rendered by the light source array do not correspond (spatially) to the images/events rendered on the display. It is therefore an object of the present invention to provide a method and a control system for correctly mapping a light source array onto a display.

According to a first aspect of the present invention, the object is achieved by a method of configuring a light source array of a system, the system further comprising a display and a camera, wherein the light source array comprises a plurality of individually controllable lighting units, and wherein the light source array has been positioned relative to the display, the method comprising:
  rendering a pattern on the display,
  controlling one or more lighting units of a first segment of the light source array according to a first light setting,
  controlling one or more lighting units of a second segment of the light source array according to a second light setting,
  obtaining an image captured by the camera, the image comprising the display, the first segment and the second segment,
  detecting the pattern in the image,
  detecting the first light setting and the second light setting in the image,
  determining positions of the first segment and the second segment relative to the display in the image based on the first light setting, the second light setting and the pattern in the image, and
  determining a mapping of the plurality of the individually controllable lighting units with respect to the display based on the positions of the first segment and the second segment relative to the display in the image, such that when media content is being rendered on the display one or more lighting units of the plurality of the individually controllable lighting units are controlled based on the media content according to the mapping.

The light source array may have been virtually segmented into a plurality of segments. The light source array may, for example, have been virtually segmented into two segments (e.g. of the same length) or into more segments. Each segment is controlled according to a different light setting. The display is controlled to render a spatial pattern. By capturing an image of the display and the segments of the light source array, and by determining the locations of the different segments relative to the pattern in the image, the (real) positions of the different segments relative to the display can be determined, which enables correctly mapping the light source array onto the display. Additionally, this provides a user-friendly way of configuring the light source array, because the user simply may point the camera towards the display and the light source array, whereupon the mapping is determined automatically.

The step of determining the mapping may comprise: associating at least the first segment with a first area of the display based on the position of the first segment relative to the display in the image. Additionally, the step of determining the mapping may comprise: associating the second segment with a second area of the display based on the position of the second segment relative to the display in the image.

The pattern may be a temporal pattern (a pattern that is different at different moments in time). A plurality of images captured by the camera may be obtained, and the positions of the first segment and the second segment relative to the display in the plurality of images are determined based on the temporal pattern. The plurality of images may comprise the temporal pattern. The temporal pattern may be such that temporal changes of the temporal pattern are not perceivable (visible) for a human.

The first or the second light setting may be an off-setting. In other words, one of the first and second segments may be switched off.

The first and/or the second light setting may be a dynamic light setting (i.e. a light setting that changes over time), and a plurality of images captured by the camera may be obtained. The plurality of images may comprise the dynamic light setting. The positions of the first segment and the second segment relative to the display in the plurality of images are determined based on the dynamic light setting. It may occur that with static light settings the mapping cannot be determined properly. This may occur due to optical mixing of the different light settings, especially if a light source is hidden behind the display and only effects are visible in the image. This can be solved by using dynamic light settings with, for example, contrasting colors or by sequentially switching segments on and off.

The method may further comprise:
  controlling the one or more lighting units of the first segment of the light source array according to the first light setting at a first moment in time, and
  controlling the one or more lighting units of the second segment of the light source array according to the second light setting at a subsequent moment in time, and wherein the step of obtaining the image captured by the camera comprises:
  obtaining a first image at the first moment in time,
  obtaining a second image at the subsequent moment in time,
wherein the position of the first segment relative to the display in the image is determined based on the first image, and wherein the position of the second segment relative to the display in the image is determined based on the second image. By sequentially switching the first and second segment, the light settings of the respective segments are captured in respective images and can therefore de (individually) detected. This may improve determining the mapping of the plurality of the individually controllable lighting units with respect to the display. The method may further comprise: switching the one or more lighting units of the first segment of the light source array off at the subsequent moment in time, and switching the one or more lighting units of the second segment of the light source array off at the first moment in time.

The method may further comprise: rendering the media content on the display, and controlling one or more lighting units of the plurality of the individually controllable lighting units based on the media content according to the mapping. This may be beneficial because a user an immediately see if the mapping is correct.

If one or more lighting units of the second segment are not adjacent to the display, the one or more lighting units of the second segment of the light source array may be controlled according to media content rendered on an area of the display most proximate to the second part of the light source array. It may occur that the light source array has been installed such that a part of the light source array is not adjacent to the display (e.g. a light strip of which only a part has been placed adjacent to one of the edges of the display). This part (segment or part of a segment) may then be controlled according to media content rendered on an area of the display most proximate to that part of the light source array. Alternatively, the one or more lighting units of the second segment of the light source array may be controlled according to a further light setting. The further light setting may be a default light setting, a user-defined light setting, a light setting of a proximate segment (a segment next to the second segment), an off-setting, etc.

The method may further comprise: determining an orientation of a controller of the light source array based on the positions of the first segment and the second segment relative to the display in the image, and storing the orientation in a memory. The orientation of a display is typically predefined (fixed). This enables determining the orientation (s) of the segments of the light source array. Since the order of the lighting units (and the locations of the segments) with respect to a (central) controller of the light source array are predefined (known), the orientation of the controller may be determined based on the positions of the segments relative to the display. The orientation may be stored in a memory for use by a device (such as a user interface device, a central lighting control device, etc.). The memory may, for example, be comprised in the user interface device, a bridge, a remote server, etc.

The method may further comprise: selecting or generating the pattern, wherein the selection or generation is based on one or more properties of the light source array. The properties may, for example, relate to the type of light source array, an identifier of the light source array, light rendering capabilities of the light source array, a distribution of the lighting units of the light source array, a number of light sources per lighting unit, etc., and the selection for or generation of a pattern to be rendered on the display may be based thereon.

According to a second aspect of the present invention, the object is achieved by a computer program product for a computing device, the computer program product comprising computer program code to perform any of the above-mentioned methods when the computer program product is run on a processing unit of the computing device.

According to a third aspect of the present invention, the object is achieved by a control system for configuring a light source array of a system, the system further comprising a display and a camera, wherein the light source array comprises a plurality of individually controllable lighting units, and wherein the light source array has been positioned relative to the display, the control system comprising:
  an input,
  one or more processors configured to:
    render a pattern on the display, control one or more lighting units of a first segment of the light source array according to a first light setting, control one or more lighting units of a second segment of the light source array according to a second light setting, obtain, via the input, an image captured by the camera, the image comprising the display, the first segment and the second segment, detect the pattern in the image, detect the first light setting and the second light setting in the image, determine positions of the first segment and the second segment relative to the display in the image based on the first light setting, the second light setting and the pattern in the image, and determine a mapping of the plurality of the individually controllable lighting units with respect to the display based on the positions of the first segment and the second segment relative to the display in the image, such that when media content is being rendered on the display one or more lighting units of the plurality of the individually controllable lighting units are controlled based on the media content according to the mapping.

It should be understood that the computer program product and the control system may have similar and/or identical embodiments and advantages as the above-mentioned methods.

In the context of the present invention the term "segment" is to be understood as a part of the light source array. The light source array may be divided into a plurality of segments which can be controlled as segments. Each segment may comprise a plurality of individually controllable lighting units that are controllable as a group.

BRIEF DESCRIPTION OF THE DRAWINGS

The above, as well as additional objects, features and advantages of the disclosed systems, devices and methods will be better understood through the following illustrative and non-limiting detailed description of embodiments of devices and methods, with reference to the appended drawings, in which.

All the figures are schematic, not necessarily to scale, and generally only show parts which are necessary in order to elucidate the invention, wherein other parts may be omitted or merely suggested.

DETAILED DESCRIPTION OF EMBODIMENTS

Figure 1A:
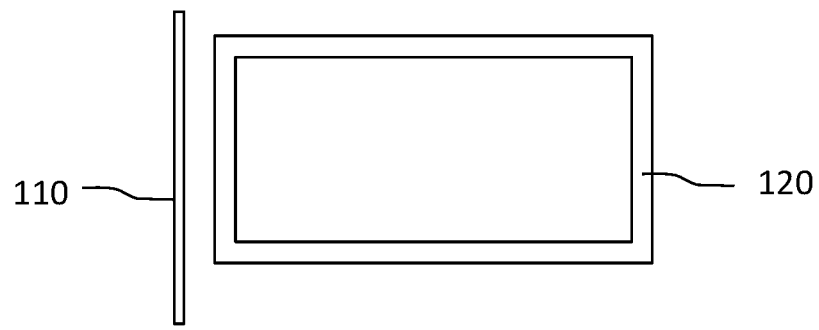
FIG. 1a shows schematically prior art wherein a light source array has been installed at a display.
Figure 1B:
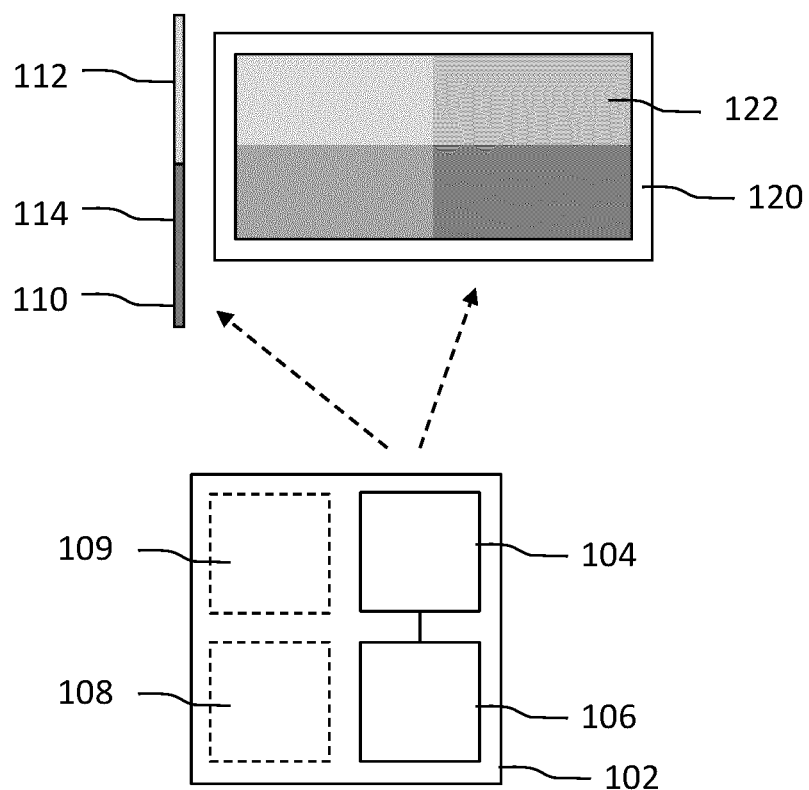
FIG. 1b shows schematically a control system for configuring the light source array.

FIG. 1a shows a display 120 and a light source array 110. The light source array 110 has been installed (positioned/placed) at the display 120. The light source array 110 may be configured to be controlled based on colors of images of media content (e.g. video, game content) being rendered on the display 120. This requires that the light sources (not shown) of the light source array 110 are correctly mapped onto the display 120. FIG. 1b shows schematically a system comprising the light source array 110, the display 120 and a control system 102 for configuring the light source array 110. The control system 102 illustrated in FIG. 1b assists the user in correctly mapping the light source array 110 with respect to the display 120.

The light source array 110 comprises individually controllable lighting units (not shown). The individually controllable lighting units may be single (LED) light sources of the light source array 110, or (small) groups of (LED) light sources (e.g. groups of 3 or 5 light sources). The light source array 110 comprises a controller configured to control the individually controllable lighting units to generate a spatial light effect across the different individually controllable lighting units. The light source array 110 further comprises a receiver configured to receive lighting control commands from the control system 102 and the controller may control the individually controllable lighting units accordingly. Control methods for such (pixelated) light source arrays are known in the art and will therefore not be discussed in detail.

The control system 102 comprises a communication unit 104 configured to communicate with the light source array 110. The communication unit 104 may communicate lighting control commands to the light source array 110 to control the individually controllable lighting units of the segments 112, 114. The communication unit may comprise hardware for transmitting the lighting control commands via one or more communication protocols for example Ethernet, DMX, DALI, USB, Bluetooth, Wi-Fi, Li-Fi, 3G, 4G, 5G or ZigBee. A specific communication technology may be selected based on the communication capabilities of the light source array 110, the power consumption of the communication driver for the (wireless) communication technology and/or the communication range of the signals. The communication unit 104 may be further configured to control the display 120, for example by communicating instructions to the display to render a pattern 122 on the display 120.

The control system 102 comprises one or more processors 106 configured to cause the display to render a pattern 122 on the display 120 (e.g. by communicating instructions to the display to render the pattern 122 on the display 120), and to control one or more lighting units of a first segment 112 of the light source array 110 according to a first light setting and to control one or more lighting units of a second segment 114 of the light source array 110 according to a second light setting. The processor 102 may communicate lighting control commands to the light source array via the communication unit 104. The lighting control commands may comprise control instructions to control the light properties of the individually controllable lighting units of the segments 112, 114 according to the respective light settings. These light properties may relate to the color, intensity, saturation, spectrum, beam size, beam shape, etc. The second light setting is different from the first light setting such that a difference can be detected in one or more images 140 captured by a camera. The first or the second light setting may be an off-setting. The light settings may for example be predefined (e.g. red and green colored, rainbow colored, on/off, etc.), random or user defined (e.g. via the user interface of the user interface device 130).

The control system 102 may further comprise the camera 109 for capturing an image 140 (see FIG. 2a) of the display 120 (which renders the pattern 122) and the first segment 112 and the second segment 114 of the light source array 110 (which are controlled to render the first and the second light settings). Alternatively, the camera may be comprised in another device, and the image 140 may be received via the communication unit. The control system 102 comprises an input (e.g. an input of the processor 106) configured to obtain the image 140, for example from the camera 109 comprised in the control system 109, or via the communication unit 104 from a remote camera.

The processor 106 is further configured to detect the pattern 122 in the image 140 and to detect the first light setting and the second light setting in the image 140. The processor 102 may use image analysis techniques to detect the pattern 122 and to the first light setting and the second light setting in the image. The processor 106 may analyze the image 140 and recognize the pattern and the first and second light settings (according to which the display 120 and the light source array 110 have been controlled, respectively) in the image 140. Such image analysis techniques are known in the art and will therefore not be discussed in detail.

The processor 106 is further configured to determine positions of the first segment 112' and the second segment 114' relative to the display 120' in the image 140 based on the first light setting, the second light setting and the pattern 122' in the image 140. This has been exemplified in FIG. 2a, wherein a user interface device 130 is configured to render the image 140 on a screen 132 of the user interface device 130. The image 140 comprises the light source array 110' and its segments 112', 114'. The image 140 further comprises the display 120' and the pattern 122'. By analyzing the image 140, the processor 106 may determine positions of the first segment 112' and the second segment 114' relative to the display 120' in the image 140. The processor 106 may use known image analysis techniques to determine these positions.

The segments of the light source array 110 may be predefined. The light source array 110 may, for example, be segmented into a plurality of equal segments. The segments may be user-defined or be adjustable by the user. The user may for example provide user input (via the user interface) to change the distribution of the segments across the light source array 110. The number of segments when configuring the light source array 110 may differ from the number of segments that are used to control the light source array 110. The number of segments when configuring the light source array 110 may be lower (e.g. two segments) compared to the number of segments when the light source array is being controlled (e.g. each lighting unit may be an individually controllable segment).

The processor 106 is further configured to determine a mapping of the plurality of the individually controllable lighting units with respect to the display 120 based on the positions of the first segment 112' and the second segment 114' relative to the display 120' in the image 140. The processor 106 may for example determine the position of the light source array 110 relative to the display 120 by determining the position of a reference point of the light source array 110' in the image 140 (e.g. a position of the distal end, the proximal end and/or the center of the light source array 110') with respect to a position of a reference point of the display 120' in the image 140 (e.g. a position of an edge and/or the center of the display 120'), and determine (and store) the (physical) position of the light source array 110 with respect to the display 120 based thereon. The processor 106 may then determine a mapping of the plurality of the individually controllable lighting units of the light source array 110 with respect to the display 120 based on the (physical) position. The processor 106 may store the mapping in a memory (e.g. memory 108, or an external memory) such that the mapping can be retrieved when media content is being rendered on the display 120, such that one or more lighting units of the plurality of the individually controllable lighting units are controlled based on the media content according to the mapping. The processor 106 may, for example, associate at least the first segment 112 with a first area of the display 120 based on the position of the first segment 112' relative to the display 120' in the image 140. Additionally, the processor 106 may associate the second segment 114 with a second area of the display 120 based on the position of the second segment 114' relative to the display 120' in the image 120. The mapping may, for example, comprise associations between (pixel) areas of the display 120 and individually controllable lighting units/ segments of the light source array 110, such that when the media content is being rendered on the display 120, individually controllable lighting units associated with an area are controlled according to colors of (pixels of) this area.

Figure 2A:
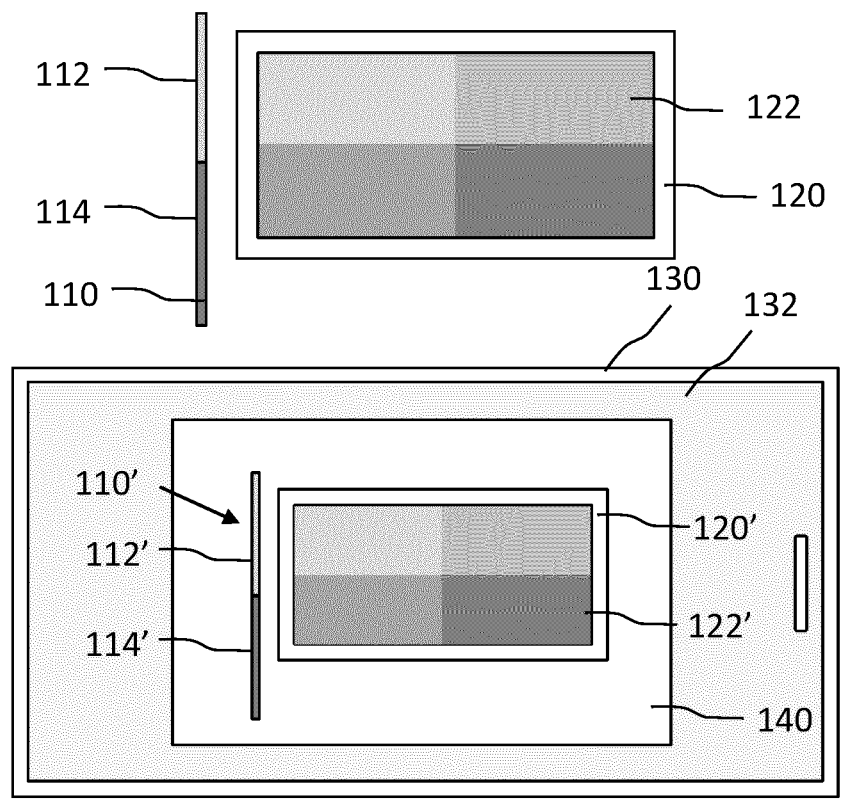
FIG. 2a shows schematically a user interface device for configuring a light source array.
Figure 2B:
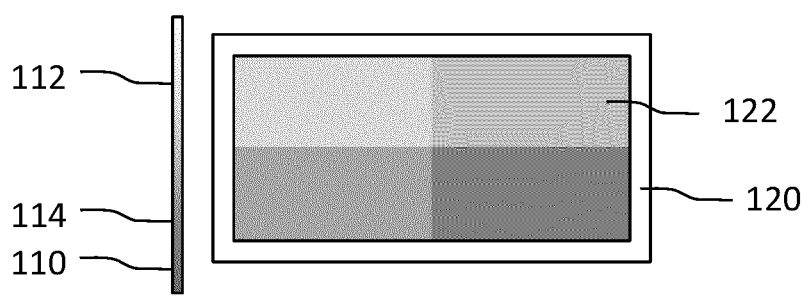
FIG. 2b shows schematically an example wherein the light source array is controlled to render a gradient light effect.

In the examples of FIGS. 1b and 2a, the light source array 110 has been segmented in two segments 112, 114. In other examples, the light source array 110 may be segmented in more than two segments. Each segment comprises one or more individually controllable lighting units. In an example, each individually controllable lighting unit may be a segment. This is illustrated in FIG. 2b, wherein the light source array 110 has been segmented such that each individually controllable lighting unit is a segment, and the light source array 110 is controlled such that a gradient is rendered across the light source array 110 which can be detected in the image 140 by the processor 106. It should be understood that these segmentations and control of the different segments are mere examples, and that the skilled person is able to design alternatives without departing from the scope of the appended claims.

The control system 102 may be comprised in a device, for example in a user interface device 130, in a central (home) control system, in a bridge, on a remote server, etc. The control system may comprise a (single) processor 106 comprised in the device. Alternatively, control system 102 may comprise a plurality of processors, for example a first processor (which may be comprised in the user interface device 130) configured to control the light source array 110 and the display 120, and a second processor (which may be comprised in a remote server which may be accessible via a network/the internet) configured to obtain the image 140 and determine the positions of the segments 112', 114' in the image relative to the display 120' and to determine the mapping based thereon. The processors may be communicatively coupled, for instance via a local or external network.

The light source array 110 may be any type of light source array 110 configured to be positioned at a display 120. The light source array 110 may for example be a light strip, a light string, a modular lighting device comprising a plurality of interconnectable elements, a (linear) array of light sources (e.g. light sources on a rail or in a luminaire), etc. FIGS. 3a-3e illustrate examples of light source arrays. The light source arrays may comprise a controller 300 for controlling the (LED) light sources (illustrated as small squares in FIGS. 3a-3g). Alternatively, the light source arrays may comprise multiple controllers 300 for controlling the light sources. The light sources may for example comprise one or more LEDs (e.g. multicolor LEDs, groups of LEDs, etc.).

Figure 3A:
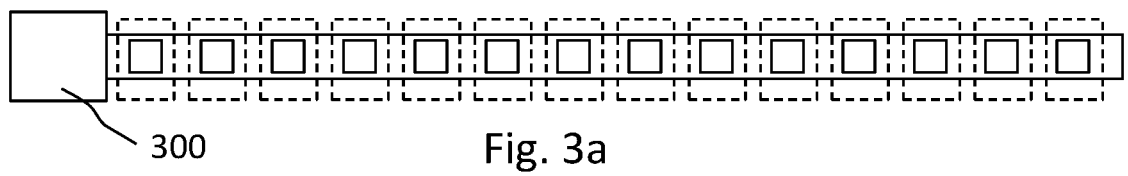
FIGS. 3a-3h illustrate examples of light source arrays.
Figure 3B:
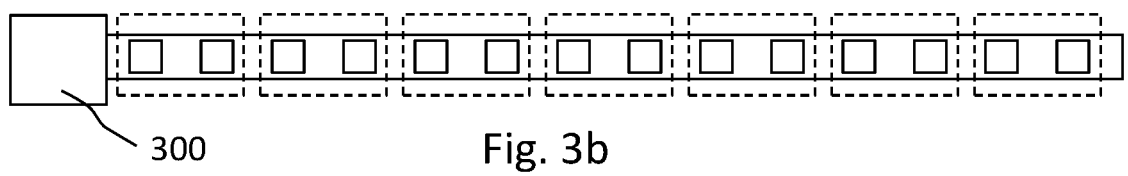
Figure 3C:
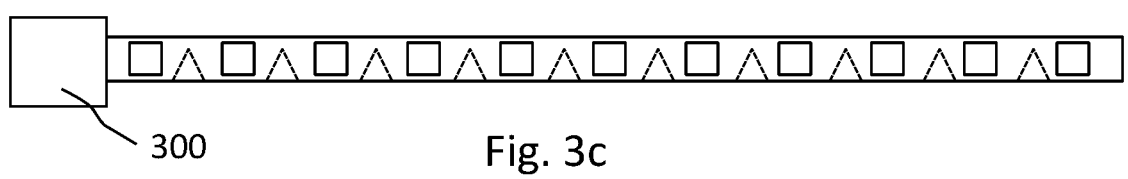
Figure 3D:
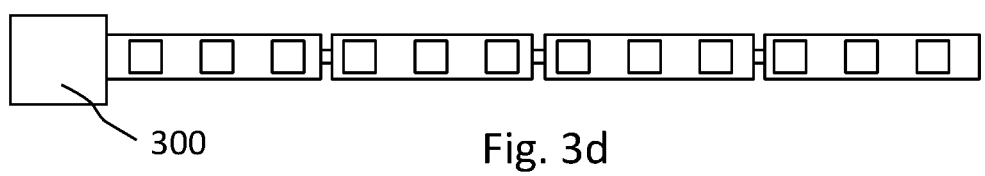
Figure 3E:
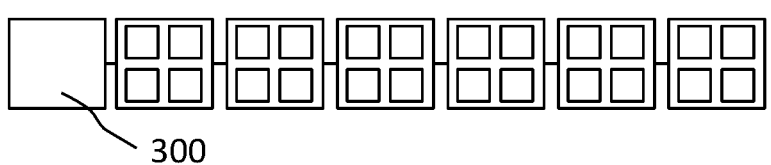

FIG. 3a illustrates an example of a light source array, wherein the light source array is a light strip. The dashed lines indicate the individually controllable lighting units. In this example, each individually controllable lighting unit comprises a light source. FIG. 3b illustrates an example of a light source array, wherein the light source array is a light strip. The dashed lines indicate the individually controllable lighting units. In this example, each individually controllable lighting unit comprises a plurality of light sources that are controlled as a group. FIG. 3c illustrates an example of a light source array, wherein the light source array is a light strip. The light strip may comprise a support surface configured to be partially cut between the light sources/individually controllable lighting units (indicated by the dashed triangles) without cutting power and control lines, which enables a user to fold the light strip at the cut in order to position the light strip at a corner of the display 120. FIG. 3d illustrates an alternative, wherein the light source array comprises connectors between lighting units, which enable a user to increase or reduce the length of the light source array. FIG. 3e illustrates an example of a light source array, wherein the light sources are positioned in a two-dimensional configuration (e.g. a tile-configuration), and wherein the light source array comprises connectors between lighting units which enable a user to increase or reduce the length of the light source array.

Figure 3F:
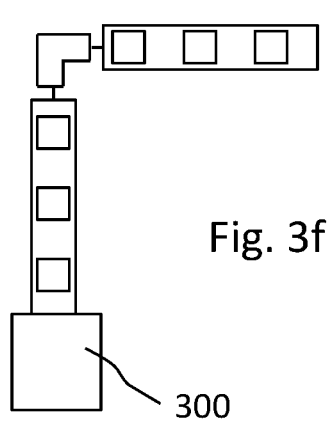
Figure 3G:
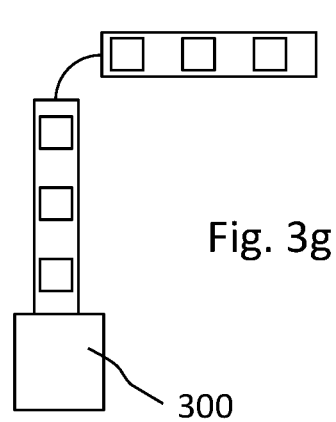
Figure 3H:
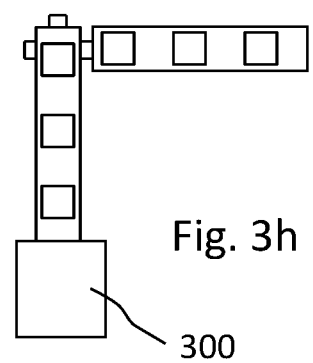

The light source array 110 is configured to be installed at the display 120, may require the light source array to be installed along a corner of the display 120. Depending on the type of light source array, the user may create the corner in the light source array 110 such that it matches the corner of the display 120. The light source array 110 may, for example, be adapted to be folded, bent and/or cut (see FIG. 3c). Additionally or alternatively, the light source array 110 may comprise connectors between the lighting units, and a user may connect the different lighting units under an angle to create the corner. FIGS. 3f-3h illustrate different examples of creating a corner with multiple lighting units. For instance, as illustrated in FIG. 3f, a corner connector element may be positioned between two lighting units (and therewith between two segments). Alternatively, as illustrated in FIG. 3g, a flexible connector may be positioned between two lighting units (and therewith between two segments). Additionally or alternatively, as illustrated in FIG. 3h, a (distal) end of a segment may comprise multiple connectors oriented in different directions, such that another segment can be connected to the (distal) end. The user interface of the user interface device 130 may be further configured to receive user input indicative of that the light source array 110 has been positioned along a corner of the display 120. The processor 106 may be configured to determine the position of the corner based on the positions of the segments in the image 140. Alternatively, the light source array 110 may be configured to communicate at which location the light source array is cornered. The controller 300 of the light source array may obtain this information based on a detected presence of a corner element (see FIG. 3o, based on a detected presence of another segment (FIG. 3h), etc., and the controller 300 may communicate this information to the processor 106 of the control system 102.

The pattern 122 may be a static pattern (i.e. a pattern that does not change over time). For a static pattern, obtaining a single image 140 captured by the camera may be enough for determining the positions of the first segment 112' and the second segment 114' relative to the display 120' in the image 140. Alternatively, the pattern 122 may be a temporal/dynamic pattern (i.e. a pattern that changes over time, for example a flashing pattern, one or more shapes moving across the display 120, etc.), and a plurality of images 140 captured by the camera may be obtained by the processor 106. The positions of the first segment 112' and the second segment 114' relative to the display 120' in the plurality of images 140 may be determined based on the temporal pattern by analyzing the plurality of images 140. The temporal changes of the temporal pattern may be such that they are not perceivable for a human. The frequency of the rendered pattern may, for example, be 60 Hz, 100 Hz or 120 Hz.

Figure 4A:
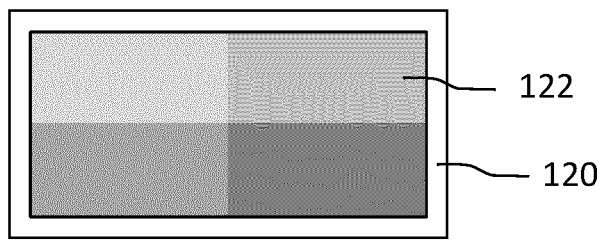
FIGS. 4a-4d illustrate examples of patterns rendered on a display.
Figure 4B:
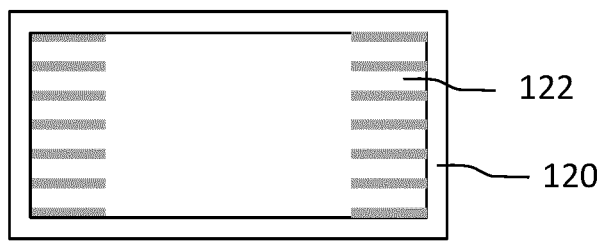
Figure 4C:
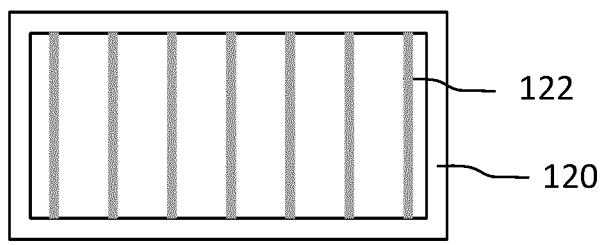
Figure 4D:
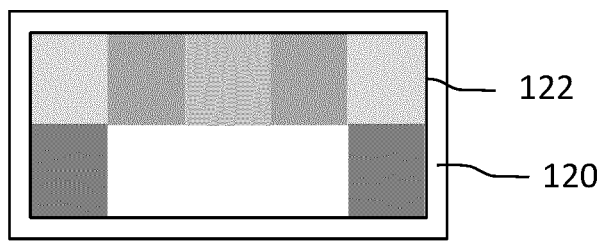

The pattern may for example be a grid, or lines of a grid. FIGS. 4a-4d illustrate examples of patterns 122 that may be rendered on the display 120. FIG. 4a illustrates a spatial pattern with four different colors. FIG. 4b illustrates a pattern with horizontal lines. FIG. 4c illustrates a pattern with vertical lines. FIG. 4d illustrates a pattern with seven areas, distributed across the left, right and top side of the display 120.

The processor 106 may be further configured to select or generate the pattern. The selection may be a selection of the pattern from a plurality of patterns (which may be stored in a memory, for example memory 108). The selection or generation may be based on one or more properties of the light source array. The properties may, for example, relate to the type of light source array 110, light rendering capabilities of the light source array, the first and second light setting, a distribution of the lighting units of the light source array 110, a number of light sources per lighting unit, etc. If, for example, the density of the lighting units of the light source array 110 is high, a striped pattern with a higher number of stripes may be selected by the processor 106 compared to a light source array 110 having a lower density of lighting units.

In another example, the processor 106 may be configured to obtain information about the dimensions of the light source array 110 and the lengths of lighting units of the light source array 110, and information about the dimensions of the display device 120. The processor 106 may then select or generate the pattern such that the pattern comprises segments (areas on the display 120) having dimensions corresponding to the lengths of lighting units of the light source array 110.

In another example, the processor 106 may be configured to obtain information about the dimensions of the light source array 110 and the lengths of the segments 112, 114 of the light source array 110, and information about the dimensions of the display device 120. The processor 106 may then select or generate the pattern such that the pattern comprises segments (areas on the display 120) having dimensions corresponding to the lengths of the segments 112, 114 of the light source array 110. This is beneficial because it improves detecting the relative position of the segments of the light source array 110 relative to the display 120.

In another example, the processor 106 may select or generate the pattern based on the (first and second) light settings of the (first and second) segments of the light source array 110. The processor 106 may select/generate a pattern that has colors contrasting the colors of the light settings which may improve detecting differences between the segments 112', 114' and the display 120' in the image 140.

The first and/or the second light setting may be a dynamic light setting (i.e. a light setting that changes over time). A plurality of images 140 captured by the camera may be obtained by the processor 106. The processor 106 may be configured to determine the positions of the first segment 112' and the second segment 114' relative to the display 120' in the plurality of images 140 based on the dynamic light setting. The processor 106 may analyze the plurality of images to detect the different segments in the image based on different light settings that are present in different images of the plurality of images 140.

The processor 106 may be configured to control the one or more lighting units of the first segment 112 of the light source array 110 according to the first light setting at a first moment in time and control the one or more lighting units of the second segment 114 of the light source array 110 according to the second light setting at a subsequent moment in time. The processor 106 may obtain a first image at the first moment in time, the first image comprising at least the display 120', the first segment 112' and its first light setting. The processor may then obtain a second image at the subsequent moment in time, the second image comprising at least the display 120', the second segment 112' and its second light setting. The processor 106 may be further configured to analyze the first image and determine the position of the first segment 112' relative to the display 120' in the first image, and to analyze the second image and determine the position of the second segment 114' relative to the display 120' in the second image.

The processor 106 may be further configured to switch the one or more lighting units of the first segment 112 of the light source array 110 off at the subsequent moment in time, and to switch the one or more lighting units of the second segment 114 of the light source array 110 off at the first moment in time. This may further improve detection of the position of the first segment 112' relative to the display 120' in the first image and the position of the second segment 114' relative to the display 120' in the second image.

The media content may be rendered on the display 120, and the one or more lighting units of the plurality of the individually controllable lighting units may be controlled based on the media content according to the mapping. The processor 106 may be configured to cause a media rendering device to render the media content. The media rendering device may, for example, be the display device comprising the display 120, an external media rendering device (e.g. a set-top box, a media player, a video game console, etc.), the user interface device 130, etc. The system may further comprise a lighting control device (e.g. a bridge, a central (home) control system, the user interface device, the display device comprising the display, etc.) for controlling the lighting units of the light source array 110 based on the media content. The lighting units may be controlled based on the media content, for instance by analyzing colors of images that are rendered on the display 120 and by controlling the lighting units accordingly. Alternatively, the lighting devices may be controlled according to a light script which comprises pre-programmed lighting control instructions. Techniques for controlling lighting units or light source arrays based on media content by a lighting control device are known in the art and will therefore not be discussed in further detail.

The processor 106 may be configured to determine an orientation of a controller 300 of the light source array 110 based on the positions of the first segment 112' and the second segment 114' relative to the display in the image 140, and store the orientation in a memory (e.g. memory 108, or in a remote memory). The orientation of a display is typically fixed or known. This enables determining the orientation(s) of the segments 112, 114 of the light source array 110. The order of the lighting units (and the locations of the segments) with respect to the (central) controller 300 of the light source array are known (see FIGS. 3a-3h) and for example be communicated to the processor 106 (e.g. by the controller 300). The processor may determine the orientation of the controller 300 based on the position of the second virtual representation relative to the first virtual representation. The processor 106 may store the orientation in a memory for use by a device (such as the user interface device 130, a central lighting control device, etc.). The memory may, for example, be comprised in the user interface device 130, a bridge, a remote server, etc.

The processor 106 may be further configured to change the pattern after the (initial) mapping has been determined, and repeat the steps for determining the mapping. These steps may be repeated upon determining that the mapping is incomplete/incorrect, or to simply check if the mapping is correct. Additionally or alternatively, the processor 106 may be further configured to change the light settings of the segments after the (initial) mapping has been determined, and repeat the steps for determining the mapping. These steps may be repeated upon determining that the mapping is incomplete/incorrect, or to simply check if the mapping is correct. A user may provide a user input (e.g. via the user interface device 130) indicative of that the mapping is incomplete/incorrect, and the processor 106 may repeat the steps with a different pattern and/or with different light settings.

Figure 5:
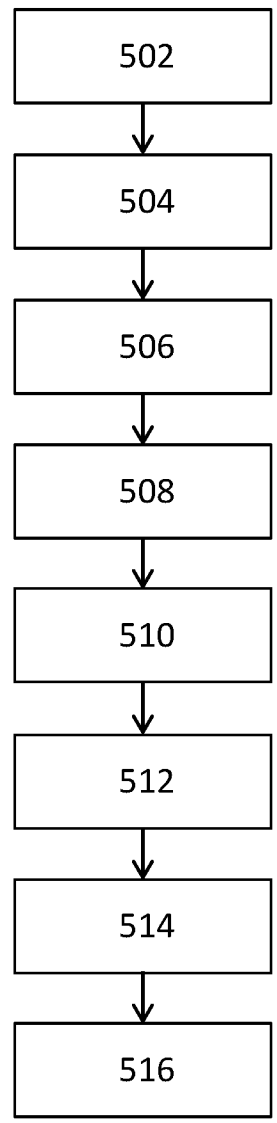
FIG. 5 shows schematically a method of configuring a light source array.

FIG. 5 shows schematically a method 500 of configuring a light source array 110 of a system, the system further comprising a display 120 and a camera 109, wherein the light source array comprises a plurality of individually controllable lighting units, and wherein the light source array has been positioned relative to the display, the method comprising:

rendering 502 a pattern on the display, controlling 504 one or more lighting units of a first segment of the light source array according to a first light setting, controlling 506 one or more lighting units of a second segment of the light source array according to a second light setting, obtaining 508 an image captured by the camera, the image comprising the display, the first segment and the second segment, detecting 510 the pattern in the image, detecting 512 the first light setting and the second light setting in the image, determining 514 positions of the first segment and the second segment relative to the display in the image based on the first light setting, the second light setting and the pattern in the image, and determining 516 a mapping of the plurality of the individually controllable lighting units with respect to the display based on the positions of the first segment and the second segment relative to the display in the image, such that when media content is being rendered on the display one or more lighting units of the plurality of the individually controllable lighting units are controlled based on the media content according to the mapping.

The method 500 may be executed by computer program code of a computer program product when the computer program product is run on a processing unit of a computing device, such as the processor 106 of the control system 102.

It should be noted that the above-mentioned embodiments illustrate rather than limit the invention, and that those skilled in the art will be able to design many alternative embodiments without departing from the scope of the appended claims.

In the claims, any reference signs placed between parentheses shall not be construed as limiting the claim. Use of the verb "comprise" and its conjugations does not exclude the presence of elements or steps other than those stated in a claim. The article "a" or "an" preceding an element does not exclude the presence of a plurality of such elements. The invention may be implemented by means of hardware comprising several distinct elements, and by means of a suitably programmed computer or processing unit. In the device claim enumerating several means, several of these means may be embodied by one and the same item of hardware. The mere fact that certain measures are recited in mutually different dependent claims does not indicate that a combination of these measures cannot be used to advantage.

Aspects of the invention may be implemented in a computer program product, which may be a collection of computer program instructions stored on a computer readable storage device which may be executed by a computer. The instructions of the present invention may be in any interpretable or executable code mechanism, including but not limited to scripts, interpretable programs, dynamic link libraries (DLLs) or Java classes. The instructions can be provided as complete executable programs, partial executable programs, as modifications to existing programs (e.g. updates) or extensions for existing programs (e.g. plugins). Moreover, parts of the processing of the present invention may be distributed over multiple computers or processors or even the 'cloud'.

Storage media suitable for storing computer program instructions include all forms of nonvolatile memory, including but not limited to EPROM, EEPROM and flash memory devices, magnetic disks such as the internal and external hard disk drives, removable disks and CD-ROM disks. The computer program product may be distributed on such a storage medium, or may be offered for download through HTTP, FTP, email or through a server connected to a network such as the Internet.

The invention claimed is:

1. A method of configuring a light source array of a system, the method comprising:
    selecting or generating a pattern based on one or more properties of the light source array,
    rendering the pattern on a display of the system,
    controlling one or more lighting units of a first segment of the light source array according to a first light setting,
    controlling one or more lighting units of a second segment of the light source array according to a second light setting, the one or more lighting units of the first and second segments being part of a plurality of individually controllable lighting units of the light source array,
    obtaining an image captured by a camera of the system, the image including the display, the first segment, and the second segment,
    detecting the pattern in the image,
    detecting the first light setting and the second light setting in the image,
    determining positions of the first segment and the second segment relative to the display in the image based on the first light setting, the second light setting, and the pattern in the image, and
    determining a mapping of the plurality of the individually controllable lighting units with respect to the display based on the positions of the first segment and the second segment relative to the display in the image, such that when media content is being rendered on the display one or more lighting units of the plurality of the individually controllable lighting units are controlled based on the media content according to the mapping.

2. The method of claim 1, wherein the step of determining the mapping comprises:
    associating at least the first segment with a first area of the display based on the position of the first segment relative to the display in the image.

3. The method of claim 2, further comprising:
    associating the second segment with a second area of the display based on the position of the second segment relative to the display in the image.

4. The method of claim 1, wherein the pattern is a temporal pattern, and wherein a plurality of images captured by the camera are obtained, and wherein the positions of the first segment and the second segment relative to the display in plurality of images are determined based on the temporal pattern.

5. The method of claim 4, wherein temporal changes of the temporal pattern are not perceivable for a human.

6. The method of claim 1, wherein the first or the second light setting is an off-setting.

7. The method of claim 1, wherein the first and/or the second light setting is a dynamic light setting, and wherein a plurality of images captured by the camera are obtained, and wherein the positions of the first segment and the second segment relative to the display in the plurality of images are determined based on the dynamic light setting.

8. The method of claim 1, wherein the method comprises:
    controlling the one or more lighting units of the first segment of the light source array according to the first light setting at a first moment in time, and
    controlling the one or more lighting units of the second segment of the light source array according to the second light setting at a subsequent moment in time, and wherein the step of obtaining the image captured by the camera comprises:
    obtaining a first image at the first moment in time,
    obtaining a second image at the subsequent moment in time,
    wherein the position of the first segment relative to the display in the image is determined based on the first image, and wherein the position of the second segment relative to the display in the image is determined based on the second image.

9. The method of claim 8, wherein the method further comprises:
    switching the one or more lighting units of the first segment of the light source array off at the subsequent moment in time, and
    switching the one or more lighting units of the second segment of the light source array off at the first moment in time.

10. The method of claim 1, further comprising:
    rendering the media content on the display, and
    controlling one or more lighting units of the plurality of the individually controllable lighting units based on the media content according to the mapping.

11. The method of claim 1, further comprising:
    determining an orientation of a controller of the light source array based on the positions of the first segment and the second segment relative to the display in the image, and
    storing the orientation in a memory.

12. The method of claim 1, wherein the light source array is a linear light source array.

13. A non-transitory computer-readable medium on which are stored a plurality of non-transitory computer-readable instructions that when executed on a processor are configured to perform steps comprising the method of claim 1.

14. A control system for configuring a light source array of a lighting system, the control system comprising:

an input,
a communication unit,
one or more processors configured to:
   select or generate a pattern based on one or more properties of the light source array,
   render the pattern on a display of the lighting system,
   control, via the communication unit, one or more lighting units of a first segment of the light source array according to a first light setting,
   control, via the communication unit, one or more lighting units of a second segment of the light source array according to a second light setting, the one or more lighting units of the first and second segments being part of a plurality of individually controllable lighting units of the light source array,
   obtain, via the input, an image captured by a camera of the lighting system, the image including the display, the first segment, and the second segment,
   detect the pattern in the image,
   detect the first light setting and the second light setting in the image,
   determine positions of the first segment and the second segment relative to the display in the image based on the first light setting, the second light setting setting, and the pattern in the image, and
   determine a mapping of the plurality of the individually controllable lighting units with respect to the display based on the positions of the first segment and the second segment relative to the display in the image, such that when media content is being rendered on the display one or more lighting units of the plurality of the individually controllable lighting units are controlled based on the media content according to the mapping.

\* \* \* \* \*